United States Patent
Bit-Babik et al.

(10) Patent No.: US 10,158,178 B2
(45) Date of Patent: Dec. 18, 2018

(54) LOW PROFILE, ANTENNA ARRAY FOR AN RFID READER AND METHOD OF MAKING SAME

(71) Applicant: SYMBOL TECHNOLOGIES, INC., Lincolnshire, IL (US)

(72) Inventors: Giorgi G Bit-Babik, Plantation, FL (US); Antonio Faraone, Fort Lauderdale, FL (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 14/225,558

(22) Filed: Mar. 26, 2014

(65) Prior Publication Data

US 2015/0123869 A1    May 7, 2015

Related U.S. Application Data

(63) Continuation-in-part of application No. 14/073,177, filed on Nov. 6, 2013, now Pat. No. 9,847,571.

(51) Int. Cl.
*H01Q 21/20* (2006.01)
*H01Q 21/00* (2006.01)
(Continued)

(52) U.S. Cl.
CPC ..... *H01Q 21/0006* (2013.01); *G06K 7/10316* (2013.01); *G06K 7/10346* (2013.01);
(Continued)

(58) Field of Classification Search
CPC .. H01Q 21/0006; H01Q 21/0087; H01Q 1/16; H01Q 21/20; H01Q 1/2216;
(Continued)

(56) References Cited

U.S. PATENT DOCUMENTS 2,217,911 A * 10/1940 Lindenblad .......... H01Q 21/205
343/800
2,562,332 A    7/1951 Riblet
(Continued)

FOREIGN PATENT DOCUMENTS

AU    199059089    1/1991
AU    2007234730 A1    10/2007
(Continued)

OTHER PUBLICATIONS

Rajagopalan et al., "Dielectric and Conductor Loss Quantification for Microstrip Reflectarray: Simulations and Measurement," IEEE Transactions on Antennas and Propagation, vol. 56, No. 4, Apr. 2008, pp. 1192-1196.*
(Continued)

*Primary Examiner* — Dieu H Duong
*Assistant Examiner* — Bamidele A Jegede

(57) ABSTRACT

An antenna array, especially for use with a radio frequency identification reader, includes a ground plane and a pair of concentric, first and second, circular elements mounted at an elevation relative to the ground plane. First ports are arranged along the perimeter of the first element, and second ports are arranged along the perimeter of the second element. Each port conveys radio frequency signals in an operating band of frequencies. Each perimeter is substantially equal to an odd multiple of one-half of a guided wavelength at a center frequency of the respective operating band. Each adjacent pair of first ports, or adjacent pair of second ports, is successively spaced apart by a spacing constituting a whole multiple of one-half of the guided wavelength at the center frequency of the respective operating band. A polarized patch antenna may be positioned within the circular elements.

19 Claims, 4 Drawing Sheets

(51) Int. Cl.
*H01Q 3/24* (2006.01)
*H01Q 9/04* (2006.01)
*H01Q 19/10* (2006.01)
*H01Q 21/06* (2006.01)
*H01Q 25/00* (2006.01)
*H01Q 1/22* (2006.01)
*G06K 7/10* (2006.01)

(52) U.S. Cl.
CPC ........... *H01Q 1/2216* (2013.01); *H01Q 3/247* (2013.01); *H01Q 9/0464* (2013.01); *H01Q 19/10* (2013.01); *H01Q 21/065* (2013.01); *H01Q 25/005* (2013.01); *Y10T 29/49016* (2015.01)

(58) Field of Classification Search
CPC ...... H01Q 3/247; H01Q 9/0464; H01Q 19/10; H01Q 21/065; H01Q 25/005; G06K 7/10316; G06K 7/10346; Y10T 29/49016
USPC ........................................................ 343/857
See application file for complete search history.

(56) References Cited

U.S. PATENT DOCUMENTS

| | | | |
|---|---|---|---|
| 2,716,191 A | 8/1955 | Bartuska, Jr. | |
| 3,022,506 A | 2/1962 | Goebels | |
| 3,063,049 A | 11/1962 | Kelly | |
| 3,299,428 A | 1/1967 | Tessari, III | |
| 3,417,400 A * | 12/1968 | Black | H01Q 13/16 343/771 |
| 3,626,418 A | 12/1971 | Berryman | |
| 3,665,480 A | 5/1972 | Fassett | |
| 3,680,112 A | 7/1972 | Thomas | |
| 3,713,167 A * | 1/1973 | David | H01Q 3/24 342/373 |
| 4,200,873 A | 4/1980 | Seeley | |
| 4,491,977 A * | 1/1985 | Paul | H03D 9/0641 343/700 MS |
| 4,608,572 A | 8/1986 | Blakney et al. | |
| 4,994,817 A | 2/1991 | Munson | |
| 4,994,820 A | 2/1991 | Suzuki | |
| 5,061,939 A * | 10/1991 | Nakase | H01Q 9/0414 343/700 MS |
| 5,523,767 A | 6/1996 | McCorkle | |
| 5,539,418 A * | 7/1996 | Egashira | H01Q 1/3275 343/712 |
| 5,675,346 A | 10/1997 | Nishikawa et al. | |
| 5,694,136 A | 12/1997 | Westfall | |
| 5,864,318 A | 1/1999 | Cosenza | |
| 5,986,615 A | 11/1999 | Westfall et al. | |
| 6,014,114 A | 1/2000 | Westfall et al. | |
| 6,124,833 A | 9/2000 | Bialkowski | |
| 6,473,048 B1 * | 10/2002 | Diaz | H01Q 1/42 343/753 |
| 6,816,122 B2 * | 11/2004 | Noro | H01Q 1/32 343/700 MS |
| 7,057,558 B2 | 6/2006 | Fukushima | |
| 7,283,101 B2 * | 10/2007 | Bisiules | H01Q 1/246 343/700 MS |
| 7,420,525 B2 * | 9/2008 | Colburn | H01Q 25/007 343/753 |
| 7,570,219 B1 * | 8/2009 | Paulsen | H01Q 1/28 343/708 |
| 8,159,394 B2 | 4/2012 | Hayes et al. | |
| 8,228,258 B2 * | 7/2012 | Montgomery | H01Q 7/00 343/795 |
| 8,339,324 B1 | 12/2012 | Dufilie | |
| 8,344,820 B1 * | 1/2013 | Chen | H01P 1/387 333/1.1 |
| 8,599,083 B2 | 12/2013 | Lindenmeier | |
| 8,681,063 B2 | 3/2014 | Endou | |
| 8,723,731 B2 | 5/2014 | Tatarnikov | |
| 8,847,832 B2 | 9/2014 | Parsche | |
| 9,331,388 B2 | 5/2016 | Lindenmeier | |
| 9,484,634 B1 | 11/2016 | Behroozi et al. | |
| 9,608,323 B1 | 3/2017 | Berens et al. | |
| 2003/0107524 A1 | 6/2003 | Hart | |
| 2005/0140557 A1 | 6/2005 | Kuroda et al. | |
| 2006/0232490 A1 * | 10/2006 | Bisiules | H01Q 1/246 343/797 |
| 2007/0085743 A1 | 4/2007 | Eberhardt et al. | |
| 2007/0205952 A1 | 9/2007 | Deng et al. | |
| 2007/0216595 A1 | 9/2007 | Hashiyama et al. | |
| 2008/0048867 A1 | 2/2008 | Oliver | |
| 2008/0180254 A1 | 7/2008 | Kajander | |
| 2008/0204326 A1 | 8/2008 | Zeinolabedin et al. | |
| 2009/0046026 A1 | 2/2009 | Nakano | |
| 2009/0096699 A1 | 4/2009 | Chiu et al. | |
| 2009/0146902 A1 | 6/2009 | Li | |
| 2009/0237314 A1 | 9/2009 | Lalezari | |
| 2009/0289865 A1 | 11/2009 | Parsche | |
| 2010/0214177 A1 | 8/2010 | Parsche | |
| 2010/0231475 A1 | 9/2010 | Ou et al. | |
| 2010/0253587 A1 * | 10/2010 | Lindenmeier | H01Q 7/00 343/797 |
| 2011/0215978 A1 * | 9/2011 | Lindenmeier | H01Q 7/00 343/744 |
| 2012/0068903 A1 | 3/2012 | Thevenard et al. | |
| 2012/0075163 A1 | 3/2012 | Nilsson | |
| 2012/0139806 A1 | 6/2012 | Zhan et al. | |
| 2012/0212383 A1 * | 8/2012 | Sengupta | H01Q 9/04 343/742 |
| 2012/0218157 A1 | 8/2012 | Endou et al. | |
| 2013/0076584 A1 | 3/2013 | Wong et al. | |
| 2013/0093641 A1 | 4/2013 | Ng | |
| 2013/0278475 A1 | 10/2013 | Sabielny | |
| 2014/0266956 A1 | 9/2014 | Rankin et al. | |
| 2014/0347243 A1 | 11/2014 | Abadi et al. | |
| 2015/0011168 A1 | 1/2015 | Chen | |
| 2015/0123868 A1 | 5/2015 | Babik et al. | |
| 2015/0255874 A1 | 9/2015 | Hung et al. | |
| 2015/0357720 A1 | 12/2015 | Chen et al. | |
| 2016/0043472 A1 | 2/2016 | Fasenfest et al. | |
| 2016/0056542 A1 | 2/2016 | Faraone et al. | |
| 2016/0226145 A1 | 8/2016 | Xu et al. | |
| 2017/0025750 A1 | 1/2017 | Su et al. | |

FOREIGN PATENT DOCUMENTS

| | | |
|---|---|---|
| EP | 1437795 A1 | 7/2004 |
| EP | 1 830 485 A1 | 9/2007 |
| EP | 2 221 915 A1 | 8/2010 |
| EP | 2 372 839 A1 | 10/2011 |
| EP | 2693565 A1 | 2/2014 |
| GB | 1529776 | 6/1977 |
| JP | H02 65505 | 3/1990 |
| JP | 200892491 A | 4/2008 |
| JP | 4744411 B2 | 8/2011 |
| WO | 2009142895 A2 | 11/2009 |
| WO | 2012055883 | 5/2012 |
| WO | 2016/028475 A1 | 2/2016 |

OTHER PUBLICATIONS

Raaza et al., "Multiple Beams Scanning Double Square Loop Antenna for UWB Communications," Semiconductor Electronicstronics (ICSE), 2010 IEEE International Conference on Wireless Communications, Networking and Information Security, WCNIS 2010, Jun. 25-27, 2010, Bejing China, pp. 320-324.*
Arun Raaza and Amit Mehta, "Multiple Beams Scanning Double Square Loop Antenna for UWB Communications" IEEE 2010.
The United States Patent and Trademark Office, "Non-Final Office Action," issued in connection with U.S. Appl. No. 14/073,177 dated Mar. 15, 2016.
The United States Patent and Trademark Office, "Non-Final Office Action," issued in connection with U.S. Appl. No. 14/073,177 dated Aug. 4, 2015.

(56) References Cited

OTHER PUBLICATIONS

International Search Report and Written Opinion of the International Searching Authority issued in connection with International App. No. PCT/US2014/062162 dated Feb. 2, 2015.
Parker G. et al.: "A dual polarized microstrip ring antenna with good isolation," Antennas and Propagation Society International Symposium, 1997. IEEE Digest Montreal, Que., Canada Jul. 13-18, 1997, New York, NY, USA, IEEEE, US vol. 2, Jul. 13, 1997, pp. 928-931, XP010246970 DOI: 10.1109/APS.1997.631679, ISBN: 978-0-7803-4178-4.
The United States Patent and Trademark Office, "Non-Final Office Action," issued in connection with U.S. Appl. No. 14/462,762 dated Feb. 3, 2016.
German Office Action for German Application No. 112014005080.6 dated Jul. 13, 2016.
The United States Patent and Trademark Office, "Non-Final Office Action," issued in connection with U.S. Appl. No. 14/073,177 dated Sep. 28, 2016.
Office Action for Canadian Patent Application No. 2928416 dated Mar. 8, 2017.
The United States Patent and Trademark Office, "Final Office Action," issued in connection with U.S. Appl. No. 14/073,177 dated Feb. 17, 2017.
Office Action for GB Patent Application No. 1607368.6 dated Sep. 5, 2017.
Notice of allowance for U.S. Appl. No. 14/073,177 dated Sep. 5, 2017.

\* cited by examiner

LOW PROFILE, ANTENNA ARRAY FOR AN RFID READER AND METHOD OF MAKING SAME

CROSS REFERENCE TO RELATED APPLICATION

The present disclosure is related to, and claims the priority benefit of, U.S. patent application Ser. No. 14/073,177, filed Nov. 6, 2013, the entire contents of which are hereby incorporated herein by reference thereto.

BACKGROUND OF THE INVENTION

The present disclosure relates generally to a compact, low profile, low-cost, multi-port, antenna array and to a method of making such an antenna array and, more particularly, to using such an antenna array with a radio frequency (RF) identification (RFID) reader for scanning RFID tags associated with items in a controlled area, especially for inventory control of the RFID-tagged items.

RFID systems are well known and are commonly utilized for item tracking, item identification, and inventory control in manufacturing, warehouse, and retail environments. Briefly, an RFID system includes two primary components: a reader (also known as an interrogator), and a tag (also known as a transponder). The tag is typically a miniature device that is capable of responding, via an air channel, to an RF interrogating signal generated by the reader. The tag is associated with an item to be monitored and is configured to generate an RF responding signal in response to the RF interrogating signal emitted from the reader. The RF responding signal is modulated in a manner that conveys identification data (also known as a payload) back to the reader. The identification data can then be stored, processed, displayed, or transmitted by the reader as needed. One or more readers can be mounted in a controlled inventory area, for example, in an overhead location on the ceiling, and the readers can cooperate to locate any particular tagged item in the inventory area, for instance, by triangulation.

For superior RFID tag detection and locationing coverage, it is known to provide each reader with an array of antenna elements that transmit the RF interrogating signal through a transmit beam that is electronically steered and scanned both in azimuth, e.g., over a steering angle of 360 degrees around a vertical plumb line or vertical axis originating from the center of an antenna of a ceiling-mounted RFID reader, and in elevation, e.g., over a steering angle span of about 90 degrees angularly away from the plumb line, and that receive the return RF responding signal through a receive beam from the tags. Effective RFID reader-beam scanning performance requires a relatively high port isolation, a relatively large beam steering angle range with a relatively narrow beam width even at large elevations, and the capability of synthesizing many different beam polarization states, e.g., linear, right-handed or left-handed, circular, etc. In fact, to maximize the likelihood of detecting the tag, the RFID system may benefit from the flexibility of generating multiple polarization states for each beam steering angle, thus limiting the likelihood that multi-path signal replicas confound a receiver of the reader. This typically requires each antenna element of the array to be more complex, or the design of complex signal-routing networks, both factors being associated with an increased cost and size. In a ceiling-mounted RFID reader, a conventional antenna array can extend away from the ceiling by a distance of as much as 300 millimeters and more. This is undesirably large for a convenient, unobtrusive, aesthetic installation, especially in an existing venue. Although decreasing the distance between the antenna elements results in a desirably smaller array, it is typically obtained at the expense of lower port isolation and poorer gain and beam-scanning performance caused by mutual coupling. Mutual coupling between the antenna elements typically results in wasted transmit power during transmission, and a lower received power from incoming signals during reception. It can also limit the effective beam steering angle range.

Accordingly, there is a need for a compact, low profile, low-cost, multi-port, antenna array with the characteristics of high port isolation, narrow beam width over a large range of steering angles, and high polarization synthesis capability, for enhanced performance, as well as to a method of making such an antenna array, especially for use with an RFID reader for scanning RFID tags associated with items in a controlled area, especially for inventory control of the RFID-tagged items.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
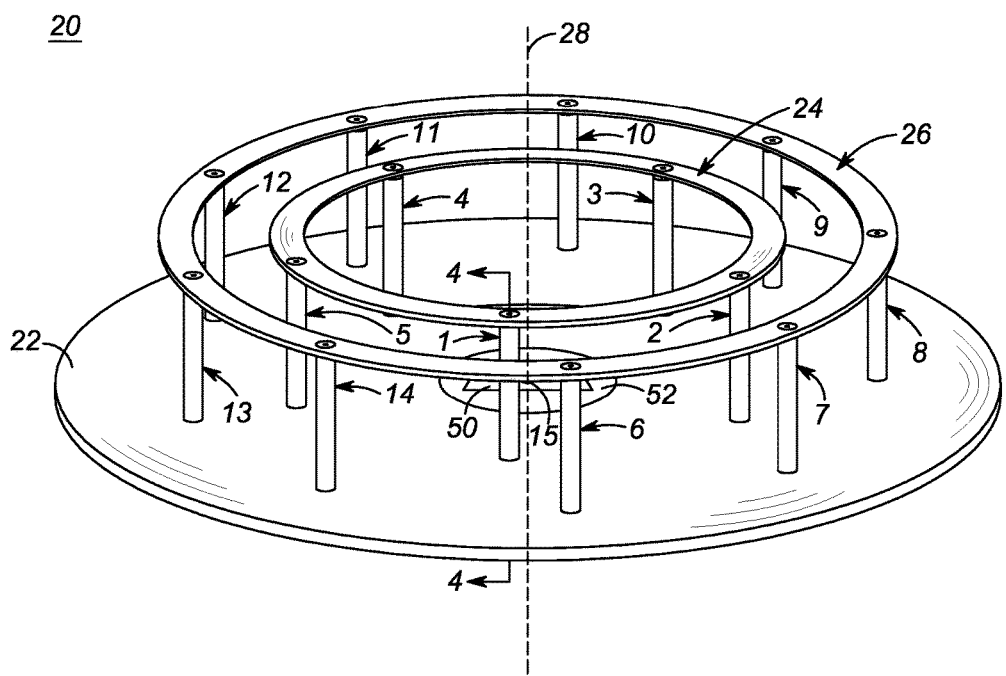
FIG. 1 is a perspective view of a compact, low profile, low-cost, multi-port, RFID antenna array with a high port isolation, a large range of steering angles, a high polarization synthesis capability, and a narrow beam width in accordance with the present disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The method and structural components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of this disclosure relates to an antenna array that includes a ground support, e.g., a ground plane; an electrically conductive, first endless element, e.g., a first circular element, mounted on, and at an elevation away from, the ground support, the first endless element extending about a central axis at a first distance transversely of the central axis along a first perimeter; and a plurality of first ports successively arranged, preferably equiangularly, apart along the first perimeter of the first endless element about the central axis for conveying radio frequency signals in a first operating band of frequencies. The first perimeter is substantially equal to an odd multiple of one-half of a guided wavelength at a center frequency of the first operating band. Each adjacent pair of first ports is successively spaced apart by a first spacing constituting a whole multiple of one-half of the guided wavelength at the center frequency of the first operating band. Each first spacing may be the same, or a different whole multiple of one-half of the guided wavelength of the first operating band.

The antenna array may also include an electrically conductive, second endless element e.g., a second circular element, mounted on, and at an elevation away from, the ground support. The second endless element extends about the central axis at a second distance transversely of the central axis along a second perimeter. The second distance is greater than the first distance. The second perimeter is greater than the first perimeter. A plurality of second ports is successively arranged, preferably equiangularly, apart along the second perimeter of the second endless element about the central axis for conveying radio frequency signals in a second operating band of frequencies. The second perimeter is substantially equal to an odd multiple of one-half of a guided wavelength at a center frequency of the second operating band. Each adjacent pair of second ports is successively spaced apart by a second spacing constituting a whole multiple of one-half of the guided wavelength at the center frequency of the second operating band. Each second spacing may be the same, or a different whole multiple of one-half the guided wavelength of the second operating band. Advantageously, but not necessarily, the number of second ports may be greater than the number of first ports. Moreover, additional, electrically conductive, endless elements, featuring analogously defined perimeters, ports, and inter-port spacings, may be provided in concentric relation to the first and second endless elements about the central axis.

The wavelength referenced herein is the guided wavelength relative to an open transmission line formed, between the ports, by the respective endless element and the ground support. More particularly, this guided wavelength is such that a signal applied at one port of one of the endless elements undergoes a whole number of phase inversions to arrive at another port belonging to the same one endless element. Since the perimeter of each endless element, i.e., the distance traveled along a respective endless element starting from any one point and ending at the very same point, is an odd multiple of one-half of a guided wavelength, and since the inter-port spacing between adjacent ports on a respective endless element is a whole multiple of one-half of a guided wavelength, it follows that the difference between the number of phase inversions going from one port to another port on the same endless element along the shortest connecting path between said ports, and the number of phase inversions going from that one port to that other port along the longest connecting path on the same endless element, is an odd number. Preferably, each endless element has a symmetrical shape about each port. For instance, each port could be located at a respective corner of an equilateral triangularly-shaped element, or at every other corner of an equilateral hexagonally-shaped element. Correspondingly, the ports of each endless element are arranged, preferably equiangularly, especially if symmetries or anti-symmetries of the synthesized antenna radiation patterns are desirable. Although this is one preferred embodiment, the ports of each endless element can also be arranged not equidistantly, or not equiangularly, provided the distance or inter-port spacing between adjacent ports is a whole multiple of one-half of the guided wavelength. This multiple can be different for different adjacent pairs of ports. By way of non-limiting example, if there are three ports labeled 1, 2 and 3, respectively, then the distance between ports 1 and 2 can be one-half of the guided wavelength, and the distance between ports 2 and 3 can be one and one-half of the guided wavelength, etc.

Also, preferably, the above-mentioned open transmission line formed between the ground support and the respective endless element features constant characteristic impedance. When this condition is met, a radio frequency signal fed at any one port will split approximately equally in opposite directions along the respective endless element. This signal split is exactly equal if the input impedance seen on either side of each port is the same. For instance, in the case of three equidistant ports where each adjacent pair of ports is spaced apart by one-half of the guided wavelength, one split signal will arrive at an adjacent port a half wavelength away (180 degrees phase shift) along the shorter connecting path, while the other split signal will arrive at the same adjacent port a full wavelength away (360 degrees phase shift) along the longer connecting path. The split signals are thus in opposite phase at the same adjacent port. Thus, there is a high (near ideal) signal cancellation at said adjacent port, and therefore, a high port isolation between the transmitting and receiving ports.

Other known means may be used that can concurrently achieve phase inversion and approximately equal amplitude when transmitting between any pair of ports of a multi-port antenna structure, to thereby produce high port isolation. For instance, it may be possible to load sections of each endless element with distributed or lumped reactive components in order to obtain the so desired phase and amplitude relationships. In this case, each endless element may be mechanically discontinuous if series elements, e.g., capacitors, are placed along its contour in order to achieve said phase relationships.

In a preferred embodiment, the ground support has an outer contoured support surface, e.g., flat, and each endless element has an outer antenna surface of complementary contour, i.e., also flat, relative to the contoured support surface, especially if symmetries or anti-symmetries of the synthesized antenna radiation patterns are desired. At any given point along each endless element, the outer antenna surface has preferably a constant dimension, e.g., width, if each endless element is formed by a strip-like structure, in the direction orthogonal to the direction along which each endless element develops, as well as the direction crossing said point and orthogonal to the ground support, and is preferably maintained at a constant distance from the outer contoured support surface.

In this way, the characteristic impedance of the transmission line formed by each endless element and the ground support is maintained essentially constant, thus substantially facilitating the energy flow and the determination of the distance between the ports, because the guided wavelength is essentially constant. For instance, the distance between each endless element and the ground support can be selected and adjusted to yield a 50 ohm impedance match at each port, as it happens, for instance, if the input impedance seen on either side of each port along the endless element is 100 ohms.

Advantageously, the antenna array of this disclosure is employed with a radio frequency (RF) identification (RFID) reader, wherein each endless element radiates radio frequency waves in the same operating band of frequencies, e.g., in a frequency range on the order of 902-928 MHz. Other frequency ranges are also contemplated. The use of two or more circular elements arranged concentrically with each other relative to the central axis assists in beam shaping. As described above, an overhead RFID reader transmits the RF interrogating signal through a transmit beam that can be electronically steered and scanned both in azimuth, e.g., over a steering angle of 360 degrees around the central axis, and in elevation, e.g., over a steering angle of about 90 degrees angularly away from the central axis, and receives the return RF responding signal from the tags through a receive beam. The concentric circular elements serve to narrow the width of these beams, thereby enhancing the tag detection likelihood since more power is available to trigger the tag response. Also, multi-path effects are mitigated since received signal replicas from off-beam directions are strongly attenuated. The concentric circular elements also serve to enhance the accuracy of the determination of the location and true bearing of each tag. In addition, for increased RF coverage at low elevation angles, a patch antenna for radiating arbitrarily-polarized waves is preferably supported by the ground plane about the central axis within each endless element to transmit and receive beams in a narrow angular range centered about the central axis, i.e., the aforementioned plumb line, generally perpendicular to the ground plane.

A method of making an antenna array, in accordance with another aspect of this disclosure, is performed by mounting an electrically conductive, first endless element on, and at an elevation away from, a ground support; extending the first endless element about a central axis at a first distance transversely of the central axis along a first perimeter; successively arranging a plurality of first ports apart along the first perimeter of the first endless element about the central axis for conveying radio frequency signals in a first operating band of frequencies; configuring the first perimeter to be substantially equal to an odd multiple of one-half of a guided wavelength at a center frequency of the first operating band; and successively spacing each adjacent pair of first ports apart by a first spacing constituting a whole multiple of one-half of the guided wavelength at the center frequency of the first operating band.

Advantageously, the method is further performed by mounting an electrically conductive, second endless element on, and at an elevation away from, the ground support; extending the second endless element about the central axis at a second distance transversely of the central axis along a second perimeter; configuring the second distance to be greater than the first distance; configuring the second perimeter to be greater than the first perimeter; successively arranging a plurality of second ports apart along the second perimeter of the second endless element about the central axis for conveying radio frequency signals in a second operating band of frequencies; configuring the second perimeter to be substantially equal to an odd multiple of one-half of a guided wavelength at a center frequency of the second operating band; and successively spacing each adjacent pair of second ports apart by a second spacing constituting a whole multiple of one-half of the guided wavelength at the center frequency of the second operating band.

Figure 2:
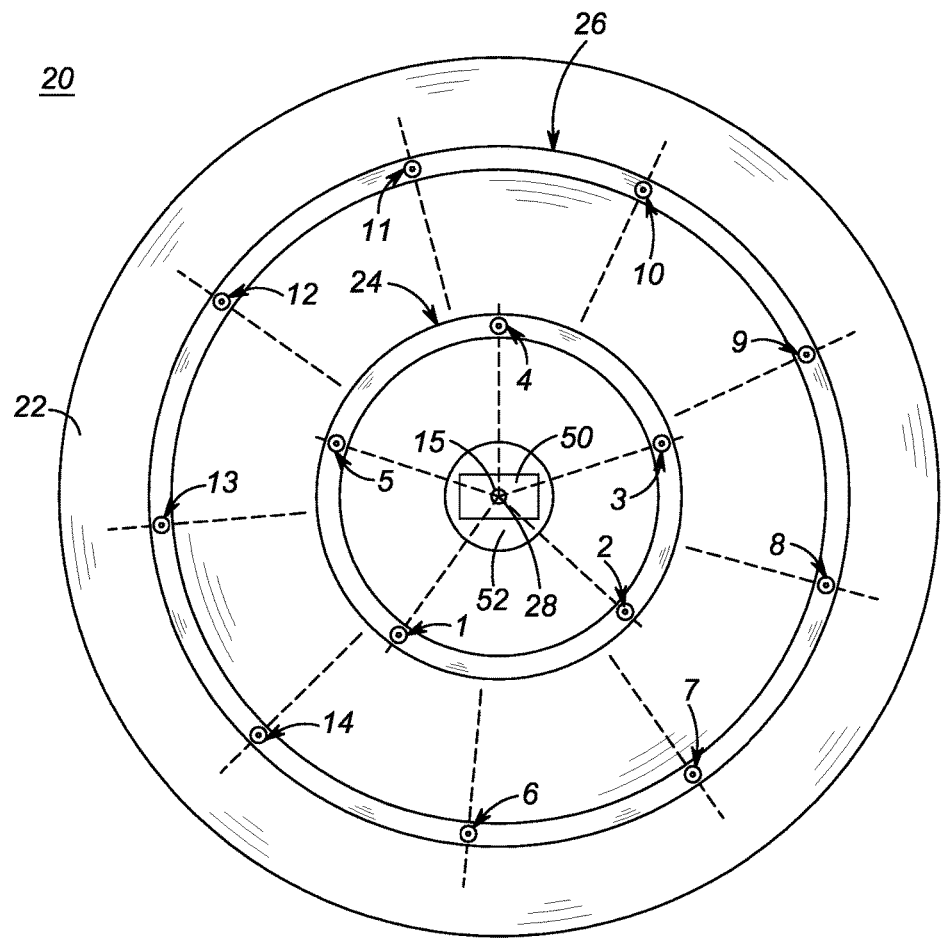
FIG. 2 is a top plan view the array of FIG. 1.

Turning now to a preferred embodiment as shown in FIGS. 1-2 of the drawings, reference numeral 20 generally identifies a compact, low profile, low-cost, multi-port, antenna array with high port isolation, large beam steering angle range, narrow beam width and high polarization synthesis capability. Antenna array 20 includes a ground support, which is configured as a ground plane 22; an electrically conductive, first endless element, which is configured as a flat ring or circular element 24, that is mounted on, and at a constant elevation, away from the ground plane 22; and a plurality of first ports 1, 2, 3, 4 and 5 that are arranged, preferably equiangularly, along a first perimeter, e.g., circumference, of the first circular element 24 for conveying radio frequency signals in a first operating band of frequencies, e.g., on the order of 902-928 MHz. The first perimeter is substantially equal to an odd multiple of one-half of a guided wavelength $\lambda$ ($\lambda/2$, $3\lambda/2$, $5\lambda/2$, and so on) at a center frequency, e.g., 914 MHz, of the first operating band. Adjacent first ports 1, 2, 3, 4 and 5 are successively spaced circumferentially apart along the first circular element 24 by first spacings constituting whole multiples of one-half of a guided wavelength ($\lambda/2$, $\lambda$, $3\lambda/2$, $2\lambda$, $5\lambda/2$, and so on) at the center frequency, e.g., 914 MHz, of the first operating band. The first spacings may all be the same, or they may all be different whole multiples of one-half of the guided wavelength of the first operating band.

The antenna array 20 further includes an electrically conductive, second endless element, which is also configured as a flat ring or circular element 26, that is mounted on, and at a constant elevation, away from the ground plane 22; and a plurality of second ports 6, 7, 8, 9, 10, 11, 12, 13 and 14 that are arranged, preferably equiangularly, along a second perimeter or circumference of the second circular element 26 for conveying radio frequency signals in a second operating band of frequencies, preferably the same as the first operating band, e.g., on the order of 902-928 MHz. The second perimeter is substantially equal to an odd multiple of one-half of a guided wavelength $\lambda$ ($\lambda/2$, $3\lambda/2$, $5\lambda/2$, and so on) at a center frequency, e.g., 914 MHz, of the second operating band. Adjacent second ports 6, 7, 8, 9, 10, 11, 12, 13 and 14 are successively spaced circumferentially apart along the second circular element 24 by first spacings constituting whole multiples of one-half of a guided wavelength $\lambda$ ($\lambda/2$, $3\lambda/2$, $2\lambda$, $5\lambda/2$, and so on) at the center frequency, e.g., 914 MHz, of the second operating band. The second spacings may all be the same, or different whole multiples of one-half of the guided wavelength of the second operating band. The first and second spacings may also be different if the guided wavelength in the first endless element is different from the guided wavelength in the second endless element. Although only two circular elements 24, 26 have been illustrated, it will be understood that additional, electrically conductive, endless elements, featuring analogous perimeters, ports, and inter-port spacings, may be provided in concentric relation to the first and second endless elements 24, 26.

Said numerical operating band of frequencies is merely exemplary, and is especially useful when the antenna array of this disclosure is employed with a radio frequency identification (RFID) reader. It will be understood that different operating frequency bands and different operating frequency ranges could also be used, for instance, by scaling the geometrical dimensions of the array 20. Although five first ports have been illustrated for the first circular element 24, any odd or even number of ports greater than two can be employed. Although nine second ports have been illustrated for the second circular element 26, any odd or even number of ports greater than two can be employed. Although the number of second ports exceeds the number of first ports in the embodiment shown in FIGS. 1-2, it is also contemplated that the numbers of the first and second ports could be equal in some embodiments, and that the number of first ports could exceed the number of second ports in other embodiments. Preferably, in order to achieve symmetries or anti-symmetries of the synthesized antenna radiation patterns, the first and second circular elements 24, 26 are symmetrical and concentric relative to a central axis 28 that extends generally perpendicularly to the ground plane 22, i.e., the aforementioned vertical plumb line originating from the center of an antenna of a ceiling-mounted RFID reader. The second circular element 26 has a greater diameter than the first circular element 24. The first and second circular elements 24, 26 preferably, but not necessarily, have the same elevation relative to the ground plane 22.

Figure 3:
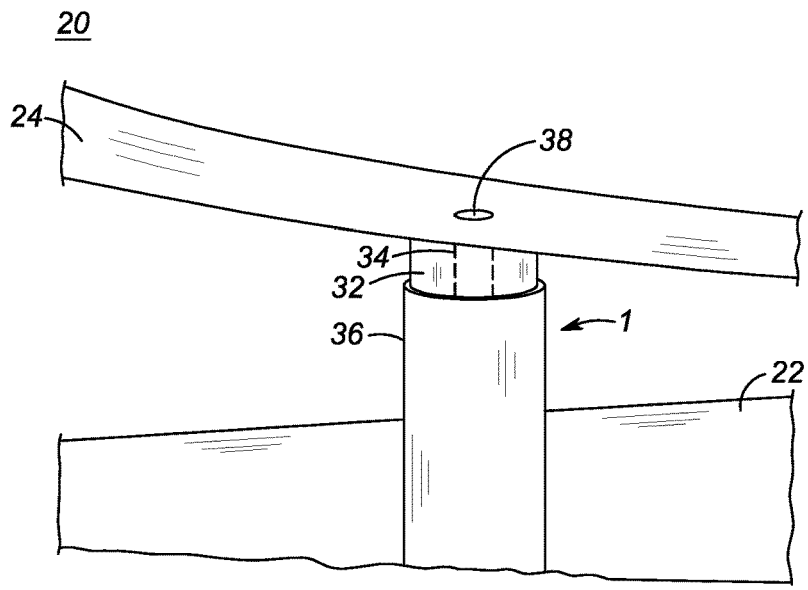
FIG. 3 is a close-up, perspective view of a detail of the array of FIG. 1.
Figure 4:
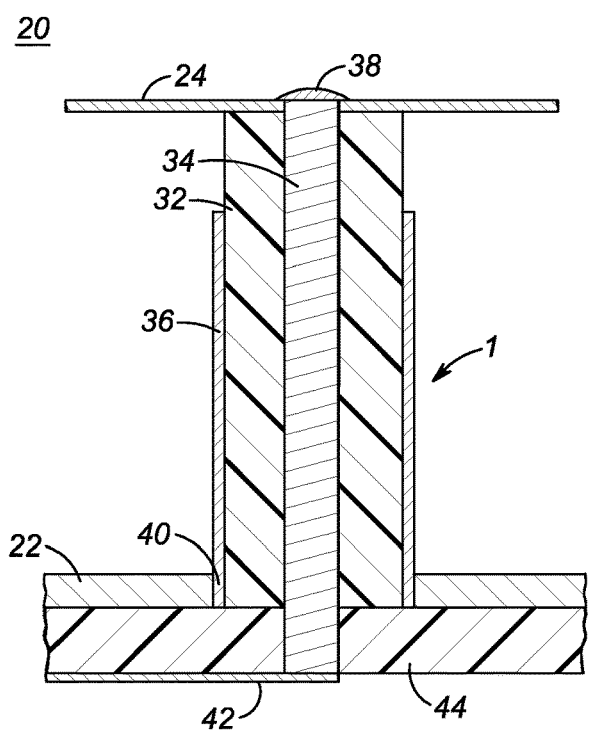
FIG. 4 is an enlarged, sectional view taken on line 4-4 of FIG. 1.

As shown in FIGS. 3-4 for representative port 1, in a preferred embodiment, each of the first and second ports includes an electrically insulating component or dielectric 32, e.g., constituted of Teflon, for holding the respective circular element 24, 26 at the same elevation; an electrical center conductor 34 extending through the dielectric 32 and galvanically connected, or electromagnetically coupled, to the respective circular element 24, 26; and an electrically shielding component or outer electrically conductive shield 36 surrounding the dielectric 32 and shielding the electrical conductor 34. Evidently, in this embodiment, the center conductor 34, the dielectric 32, and the conductive shield 36 form a coaxial cable that can provide a suitable means for delivering the radio frequency signals to the respective antenna element 24, 26. This cable, if sufficiently mechanically rigid, also provides the mechanical function of suspending and supporting the respective circular element 24, 26 above the ground plane 22. In the preferred embodiment of FIG. 4, an upper end of the conductor 34 extends through a hole that extends through the respective circular element 24, 26 and is soldered at weld joint 38. A lower end 40 of the conductive shield 36 is galvanically connected to the ground plane 22. A lower end of the conductor 34 extends through a hole in the ground plane 22, the hole having a diameter approximately equal to the inner diameter of the conductive shield 36. The lower end of the conductor 34 extends through the ground plane 22 and, as illustrated in FIG. 4, is electrically connected to a microstrip feed line 42 on a dielectric substrate 44 provided at the underside of the ground plane 22. In another embodiment (not shown), the lower end of the conductor 24 extends through the ground plane 22 and is electrically connected to a stripline feed line embedded within a dielectric substrate provided at the underside of the ground plane 22.

The characteristic impedance of this coaxial cable is frequently designed to be the same as the microstrip feed line 42, e.g., 50 ohms, so that no RF insertion loss is caused by the microstrip-to-coaxial transition. However, there may be cases when an impedance discontinuity can be usefully employed to improve the impedance match between the antenna and the microstrip feed line 42. For instance, if the natural impedance seen at the antenna ports is 200 ohms and the microstrip line impedance is 50 ohms, then the geometrical and dielectric parameters of the coaxial cable formed by the center conductor 34, the dielectric 32, and the conductive shield 36 can be chosen to produce an electrical length of a quarter wavelength and a characteristic impedance of 100 ohms, thereby producing, as it is well known in the art, a very good impedance match between the antenna and the microstrip feed line 42 about the antenna center operating frequency. It will be understood that a different feed arrangement, such as a coaxial cable and mated coaxial RF connectors for each port, could also be used instead of the microstrip or stripline arrangement to feed a signal to the conductor 34.

In a preferred embodiment, especially if symmetries or anti-symmetries of the synthesized antenna radiation patterns are desired, the ground plane 22 has an outer contoured support surface, and the respective circular element 24, 26 has an outer antenna surface of complementary contour to the contoured support surface. As shown in the embodiment of FIGS. 1-2, the respective circular element 24, 26 is planar and its outer antenna surface is generally parallel to, and at approximately a constant elevation relative to, the outer planar support surface of the ground plane 22. The respective circular element is maintained at the aforementioned constant elevation from the ground plane 22 by the dielectric 32 of each port. The constant elevation between the respective circular element 24, 26 and the ground plane 22 is selected and/or adjusted, as described below, to allow a desired impedance match, e.g., 50 ohms, to be achieved at each port to efficiently radiate/receive RF power at any of the ports, while also providing a sufficient clearance or aperture between the circular elements 24, 26 and the ground plane 22 for the electromagnetic field to radiate efficiently.

Optionally, a pair of annular adjustment elements (not illustrated) can be fixedly mounted on the ground support 22 for adjusting the distance between the respective circular element 24, 26 and the ground support 22 to achieve a desired impedance match. Each adjustment element may be one of a set of such adjustment elements of different heights. A user selects each adjustment element of the proper height, thereby setting the constant elevation between the respective circular element and the ground support 22 to an optimum value. In a preferred embodiment, each adjustment element has a thin cross-section and is galvanically connected to the ground support 22 and to the conductive shield 36 of each port. The use of the adjustment elements is optional, because there are other ways to achieve the desired impedance match, as described above.

Furthermore, other embodiments of the adjustment element may include the case where the adjustment element is suspended between the ground support 22 and the respective circular element. For instance, each adjustment element may be galvanically connected to the conductive shield 36 of each port and be supported mechanically by each conductive shield 36 at some elevation from the ground support 22, and at another distance from the respective circular element. Again, the use of such an adjustment element is optional.

In an exemplary embodiment, each circular element 24, 26 is constituted of a metal, such as steel, preferably with a gold or nickel plating. When operative at the above-mentioned operating band of frequencies, each circular element 24, 26 has a width of about 19 mm, and is maintained at a low profile elevation of about less than 45 mm relative to the ground plane 22 to obtain approximately the desired 50 ohm impedance match. The outer diameter of the first circular element 24 is about 264 mm. The outer diameter of the second circular element 26 is about 482 mm. The outer diameter of the ground plane 22 is about 632 mm, thereby rendering the entire antenna array compact. These numerical values are merely exemplary and are not intended to limit the invention.

In use as a transmitting antenna, a plurality of RF sources and receivers, together with antenna matching circuits (not illustrated), preferably one matching circuit for each port, are mounted at the opposite side of the ground plane 22, preferably between the microstrip line 42 and the center conductor 34. Each source generates an RF signal that is conducted along the respective microstrip line 42 to the respective center conductor 34, through a matching circuit, if needed, and to the respective circular element 24, 26. Thus, each radio frequency signal is fed to each port, preferably simultaneously, and is radiated from the circular elements. The fourteen illustrated ports, so decoupled, can produce a wide variety of high-gain narrow width beams featuring many different polarization states, for instance, by employing known generalized beamforming synthesis techniques. The RF signal emitted at any one port, e.g., representative port 1, will split equally in opposite circumferential directions along the respective circular element. One split signal will arrive at an adjacent port, e.g., port 2, a half wavelength away (180 degrees out of phase), while the other split signal will arrive at the same adjacent port 2 a whole number of full wavelengths away (thus, in phase). The same analysis is valid for any other pair of ports due to the mentioned constraints on the perimeters of the endless elements 24, 26 and the inter-port spacings along either element. The split signals thus feature opposite phases and approximately equal amplitudes (because the endless elements form transmission lines with small attenuation), and substantially cancel each other out, at the same adjacent port 2. Due to the aforementioned constraints, all pairs of ports belonging to the same endless element feature the same properties. In practice, isolation between the ports is on the order of 12 to 30 dB, with lower isolation between ports on different endless elements, and with larger isolation between ports on the same endless element.

Thus, there is a high port isolation between the ports across the aforementioned operating band, provided that the attenuation losses of the antenna array are moderate. Advantageously, the antenna array of this disclosure is employed with a radio frequency (RF) identification (RFID) reader, especially where the reader is mounted overhead on the ceiling of a controlled area in which RFID-tagged items are located. The ground plane 22 is mounted on, or parallel to, the ceiling, and the two circular elements 24, 26 extend downwardly away from the ground plane 22 such that the central axis 28, i.e., the aforementioned plumb line, is generally vertical. The use of two circular elements 24, 26 arranged concentrically with each other relative to the vertical central axis 28 assists in beam shaping. As described above, the overhead RFID reader transmits the RF interrogating signal through a transmit beam that is electronically steered by weighting factors and scanned both in azimuth, e.g., over a steering angle of 360 degrees around the axis 28, and in elevation, e.g., over a steering angle of about 90 degrees angularly away from the axis 28, and receives the return RF signal through a receive beam from the tags. The optimized weighting factors of the signals feeding all the ports of the concentric circular elements 24, 26 help narrow the widths of these beams, e.g., to beam widths on the order of 10 degrees to 30 degrees, thereby enhancing the antenna pattern gain and the accuracy of the determination of the location and true bearing of each tag. A different optimized set of weighting factors is applied for each direction of beam steering. Antenna gain of over 10 dBi for elevation angles in a range of between 25 degrees and 65 degrees, and azimuth angles in a range of between 0 degrees and 360 degrees, are obtainable.

Also, for increased RF coverage, a patch antenna 50, preferably configured as a microstrip antenna, for radiating arbitrarily-polarized waves is preferably supported on a center circular platform 52 by the ground plane 22 and has at least one port 15 to increase the gain of transmit and receive beams within a narrow angular range, e.g., elevation angles between 0 degrees and 25 degrees, centered about the vertical central axis 28 generally perpendicular to the ground plane 22. The platform 52 has a diameter of about 160 mm in a preferred embodiment. Port 15 is supported, and an interrogating RF signal is conducted to port 15, just as described above for representative port 1, and as shown in FIGS. 3-4. Thus, antenna gain is increased for the area directly underneath the array 20. According to the current state of the art, the geometry of the patch antenna 50 can be designed, and the number and location of its ports selected, to emit circular, elliptical, or linearly polarized waves. The patch antenna 50 could also be a dipole for radiating a linear polarized wave, or a pair of crossed dipoles for radiating mutually orthogonal polarized waves. The crossed dipoles typically have two corresponding feed ports, one for each polarization.

Figure 5:
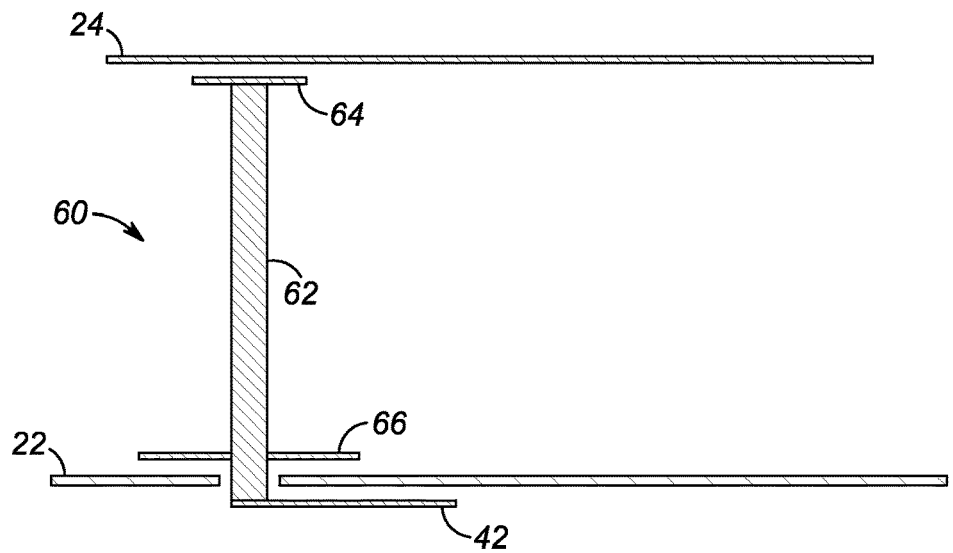
FIG. 5 is a sectional view analogous to FIG. 4 of a further embodiment of an antenna array in accordance with the present disclosure.

FIG. 5 is a view analogous to FIG. 4, but depicting another preferred embodiment, in which the respective circular element is again suspended above a ground plane 22. However, in contrast to the above-described coaxial cable configuration of the representative port 1 in FIG. 4, the representative port 60 in FIG. 5 is configured as a solid metal post 62. An upper metal disk 64 at or adjacent the top of the post 62 is spaced from the respective circular element and serves as a series capacitor therewith. A dielectric (not illustrated so as to simplify the drawing) is located between the disk 64 and the respective circular element to support the latter. A lower metal disk 66 at or adjacent the bottom of the post 62 is spaced from the ground plane 22 and serves as a shunt capacitor therewith. A dielectric (not illustrated so as to simplify the drawing) is located between the disk 66 and the ground plane 22. The size and spacing of these disks 64, 66, as well as the permittivity of the aforementioned dielectrics, control the value of their capacitances and are employed to optimize the aforementioned impedance match, and may replace the aforementioned adjustment elements. The post 62 in FIG. 5 extends through the ground support 22, and the bottom end of the post 62 is galvanically connected to the aforementioned microstrip feed line 42. Again, a dielectric support between the feed line 42 and the ground support 22 has been omitted so as not to encumber the drawing.

Figure 6:
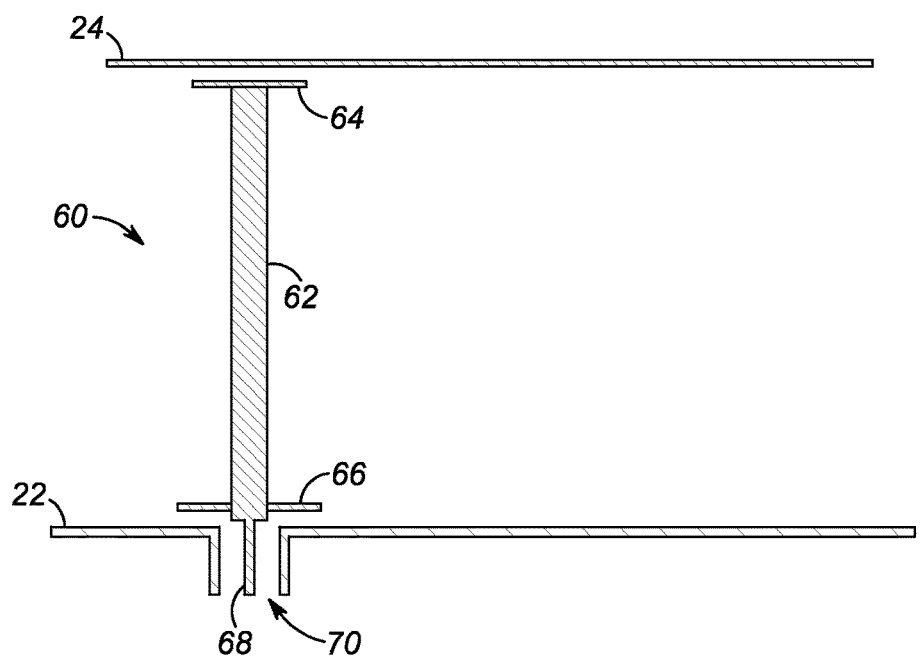
FIG. 6 is a view analogous to FIG. 5, but showing a different physical embodiment providing a signal feed.

FIG. 6 is a view analogous to FIG. 5, but depicting another preferred embodiment, in which a conductor 68 at the bottom of the post 62 extends through the ground plane 62, and a coaxial RF connector 70 is used to feed a signal to representative port 60. The representative port 60 depicted in FIG. 5 or FIG. 6 can replace any one, or all, of the ports 1-14.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An apparatus, comprising:
 a ground support;
 an electrically conductive, first endless element mounted on, and at an elevation away from, the ground support, the first endless element extending about a central axis at a first distance transversely of the central axis along a first perimeter; and
 first ports successively arranged apart along the first perimeter of the first endless element about the central axis for conveying radio frequency signals in a first operating band of frequencies, a first one of the first ports including:
  a series capacitor formed by a first plate spaced apart from the first endless element at a first location between the first endless element and the ground support; and
  a shunt capacitor formed by a second plate spaced apart from the ground support at a second location between the first endless element and the ground support;
 wherein:
  the first perimeter is substantially equal to an odd multiple of one-half of a guided wavelength at a center frequency of the first operating band,
  each adjacent pair of the first ports is successively spaced apart by a first spacing constituting a whole multiple of one-half of the guided wavelength at the center frequency of the first operating band, and
  the first location is proximate to the first endless element and the second location is proximate to the ground support.

2. The apparatus of claim 1, further comprising:
 an electrically conductive, second endless element mounted on, and at an elevation away from, the ground support, the second endless element extending about the central axis at a second distance transversely of the central axis along a second perimeter, the second distance being greater than the first distance, the second perimeter being greater than the first perimeter; and
 second ports successively arranged apart along the second perimeter of the second endless element about the central axis for conveying radio frequency signals in a second operating band of frequencies, the second perimeter being substantially equal to an odd multiple of one-half of a guided wavelength at a center frequency of the second operating band, and each adjacent pair of the second ports being successively spaced apart by a second spacing constituting a whole multiple of one-half of the guided wavelength at the center frequency of the second operating band.

3. The apparatus of claim 2, wherein the ground support is a ground plane, and wherein each endless element is a generally planar strip that is generally parallel to the ground plane.

4. The apparatus of claim 2, wherein the elevation of each endless element is the same relative to the ground support.

5. The apparatus of claim 2, wherein each endless element extends around a circle and is circumferentially complete, and wherein the endless elements are concentric relative to the central axis.

6. The apparatus of claim 5, wherein the first ports are equiangularly spaced apart along the first perimeter of the first circular endless element, and wherein the second ports are equiangularly spaced apart along the second perimeter of the second circular endless element.

7. The apparatus of claim 2, wherein the first and second operating bands are the same and lie in a frequency range on the order of 902-928 MHz to accommodate a radio frequency identification reader.

8. The apparatus of claim 1, further comprising a patch antenna mounted on the ground support about the central axis within the first endless element, and operative for radiating polarized waves.

9. The apparatus of claim 1 wherein the first and second plates are disposed on a metal post.

10. A method of making an antenna array, comprising:
mounting an electrically conductive, first endless element on, and at an elevation away from, a ground support, and extending the first endless element about a central axis at a first distance transversely of the central axis along a first perimeter;
successively arranging first ports apart along the first perimeter of the first endless element about the central axis for conveying radio frequency signals in a first operating band of frequencies;
forming a series capacitor by mounting a first plate spaced apart from the first endless element at a first location between the first endless element and the ground support;
forming a shunt capacitor by mounting a second plate spaced apart from the ground support at a second location between the first endless element and the ground support, wherein the first location is proximate to the first endless element and the second location is proximate to the ground support;
configuring the first perimeter to be substantially equal to an odd multiple of one-half of a guided wavelength at a center frequency of the first operating band; and
successively spacing each adjacent pair of the first ports apart by a first spacing constituting a whole multiple of one-half of the guided wavelength at the center frequency of the first operating band.

11. The method of claim 10, further comprising:
mounting an electrically conductive, second endless element on, and at an elevation away from, the ground support;
extending the second endless element about the central axis at a second distance transversely of the central axis along a second perimeter;
configuring the second distance to be greater than the first distance;
configuring the second perimeter to be greater than the first perimeter;
successively arranging a plurality of second ports apart along the second perimeter of the second endless element about the central axis for conveying radio frequency signals in a second operating band of frequencies;
configuring the second perimeter to be substantially equal to an odd multiple of one-half of a guided wavelength at a center frequency of the second operating band; and
successively spacing each adjacent pair of the second ports apart by a second spacing constituting a whole multiple of one-half of the guided wavelength at the center frequency of the second operating band.

12. The method of claim 11, further comprising configuring the first and second operating bands to be the same and to lie in a frequency range on the order of 902-928 MHz to accommodate a radio frequency identification reader.

13. The method of claim 11, further comprising configuring the ground support as a ground plane, and configuring each endless element as a generally planar strip that is generally parallel to the ground plane.

14. The method of claim 11, further comprising configuring the elevation of each endless element to be the same relative to the ground support.

15. The method of claim 11, further comprising configuring each endless element to extend around a circle and to be circumferentially complete, and configuring the endless elements to be concentric relative to the central axis.

16. The method of claim 15, further comprising equiangularly spacing the first ports apart along the first perimeter of the first circular endless element, and equiangularly spacing the second ports apart along the second perimeter of the second circular endless element.

17. The method of claim 10, further comprising mounting a patch antenna on the ground support about the central axis within the first endless element.

18. The apparatus of claim 1, wherein the first one of the first ports includes a first dielectric between the first plate and the first endless element, and a second dielectric between the second plate and the ground support.

19. The method of claim 10, further comprising positioning a first dielectric between the first plate and the first endless element, and positioning a second dielectric between the second plate and the ground support.

* * * * *